(12) United States Patent
Yan et al.

(10) Patent No.: US 11,316,617 B2
(45) Date of Patent: Apr. 26, 2022

(54) INFORMATION HAVING SYMBOL REPETITION

(71) Applicant: LENOVO (BEIJING) LIMITED, Beijing (CN)

(72) Inventors: Zhi Yan, Beijing (CN); Haipeng Lei, Beijing (CN); Xiaodong Yu, Beijing (CN); Chenxi Zhu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 96 days.

(21) Appl. No.: 16/636,588

(22) PCT Filed: Aug. 4, 2017

(86) PCT No.: PCT/CN2017/096037
§ 371 (c)(1),
(2) Date: Feb. 4, 2020

(87) PCT Pub. No.: WO2019/024092
PCT Pub. Date: Feb. 7, 2019

(65) Prior Publication Data
US 2021/0167893 A1    Jun. 3, 2021

(51) Int. Cl.
*H04L 1/08* (2006.01)
(52) U.S. Cl.
CPC ..................................... *H04L 1/08* (2013.01)
(58) Field of Classification Search
CPC ....................................................... H04L 1/08
See application file for complete search history.

(56) References Cited

U.S. PATENT DOCUMENTS

| | | | |
|---|---|---|---|
| 5,535,239 A | 7/1996 | Padovani et al. | |
| 2008/0089360 A1 | 4/2008 | Raaf | |
| 2011/0013615 A1 | 1/2011 | Lee et al. | |
| 2011/0206147 A1* | 8/2011 | Hariharan | H04L 1/08 375/260 |
| 2011/0280327 A1 | 11/2011 | Ko et al. | |
| 2011/0299468 A1 | 12/2011 | Van Nee et al. | |
| 2014/0198874 A1 | 7/2014 | Kim et al. | |

(Continued)

FOREIGN PATENT DOCUMENTS

| | | |
|---|---|---|
| CN | 101686218 A | 3/2010 |
| CN | 102035622 A | 4/2011 |
| CN | 102948123 A | 2/2013 |

OTHER PUBLICATIONS

Chakrapani, Arvind "On the Design Details of SS/PBCH, Signal Generation and PRACH in 5G-NR" IEEE Access Jul. 2020. (Year: 2020).*

(Continued)

*Primary Examiner* — Jeffrey M Rutkowski
*Assistant Examiner* — Basil Ma
(74) *Attorney, Agent, or Firm* — Kunzler Bean & Adamson (57) ABSTRACT

Apparatuses, methods, and systems are disclosed for information having symbol repetition. One apparatus (300) includes a transmitter (310) that transmits (1602) multiple sets of information. Each set of information of the multiple sets of information includes a group of basic symbols and optional repetition symbols, and the optional repetition symbols are a repetition of at least part of the group of basic symbols.

20 Claims, 9 Drawing Sheets

(56) References Cited

U.S. PATENT DOCUMENTS

| 2015/0085795 | A1* | 3/2015 | Papasakellariou | ...... | H04L 5/006 |
| | | | | | 370/329 |
| 2015/0296518 | A1* | 10/2015 | Yi | ...... | H04W 72/042 |
| | | | | | 370/336 |
| 2017/0006578 | A1* | 1/2017 | Rico Alvarino | ...... | H04L 1/0038 |
| 2017/0279472 | A1* | 9/2017 | Wong | ...... | H04B 1/06 |

OTHER PUBLICATIONS

International Application No. PCT/CN2017/096037, International Search Report and the Written Opinion of the International Search Authority, dated Apr. 26, 2018, pp. 1-9.

* cited by examiner

| First Block 402 | Second Block 404 | Third Block 406 | Fourth Block 408 | Fifth Block 410 | Sixth Block 412 | Seventh Block 414 | Eighth Block 416 |

| First Frame 502 | Second Frame 504 | Third Frame 506 | Fourth Frame 508 | Fifth Frame 510 | Sixth Frame 512 | Seventh Frame 514 | Eighth Frame 516 |

| 0 | 1 | 2 | 3 | 4 | 5 | 6 | 7 | 8 | 9 |

INFORMATION HAVING SYMBOL REPETITION

FIELD

The subject matter disclosed herein relates generally to wireless communications and more particularly relates to information having symbol repetition.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, transmission of certain information may be repeated. In such networks, the manner of repetition may not be defined.

BRIEF SUMMARY

Apparatuses for information having symbol repetition are disclosed. Methods and systems also perform the functions of the apparatus. In one embodiment, the apparatus includes a transmitter that transmits multiple sets of information. In such an embodiment, each set of information of the multiple sets of information includes a group of basic symbols and optional repetition symbols, and the optional repetition symbols are a repetition of at least part of the group of basic symbols.

In one embodiment, the group of basic symbols is repeated in a first symbol of the optional repetition symbols of the multiple sets of information until the first symbol of the optional repetition symbols of each set of information is filled. In certain embodiments, the group of basic symbols is repeated in the optional repetition symbols of a set of information of the multiple sets of information until the set of information is filled.

In various embodiments, one or more symbols of the group of basic symbols are repeated in the optional repetition symbols of each set of information of the multiple sets of information. In some embodiments, the group of basic symbols is repeated partially or entirely a number of times among the multiple sets of information. In one embodiment, the multiple sets of information include cell broadcast information. In a further embodiment, the multiple sets of information include system information. In certain embodiments, a number of symbols of the group of basic symbols is fixed or preconfigured by a system. In various embodiments, a number of symbols of the optional repetition symbols ranges from zero to a positive number and is determined based on a system configuration. In one embodiment, a number of the multiple sets of information is fixed or determined based on a system configuration.

A method for information having symbol repetition, in one embodiment, includes transmitting multiple sets of information. In such an embodiment, each set of information of the multiple sets of information includes a group of basic symbols and optional repetition symbols, and the optional repetition symbols are a repetition of at least part of the group of basic symbols.

In one embodiment, an apparatus for information having symbol repetition includes a receiver that receives multiple sets of information. In such an embodiment, each set of information of the multiple sets of information includes a group of basic symbols and optional repetition symbols, and the optional repetition symbols are a repetition of at least part of the group of basic symbols.

In one embodiment, the group of basic symbols is repeated in a first symbol of the optional repetition symbols of the multiple sets of information until the first symbol of the optional repetition symbols of each set of information is filled. In certain embodiments, the group of basic symbols is repeated in the optional repetition symbols of a set of information of the multiple sets of information until the set of information is filled.

In various embodiments, one or more symbols of the group of basic symbols are repeated in the optional repetition symbols of each set of information of the multiple sets of information. In some embodiments, the group of basic symbols is repeated partially or entirely a number of times among the multiple sets of information. In one embodiment, the multiple sets of information include cell broadcast information. In a further embodiment, the multiple sets of information include system information. In certain embodiments, a number of symbols of the group of basic symbols is fixed or preconfigured by a system. In various embodiments, a number of symbols of the optional repetition symbols ranges from zero to a positive number and is determined based on a system configuration. In one embodiment, a number of the multiple sets of information is fixed or determined based on a system configuration.

A method for information having symbol repetition, in one embodiment, includes receiving multiple sets of information. In such an embodiment, each set of information of the multiple sets of information includes a group of basic symbols and optional repetition symbols, and the optional repetition symbols are a repetition of at least part of the group of basic symbols.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
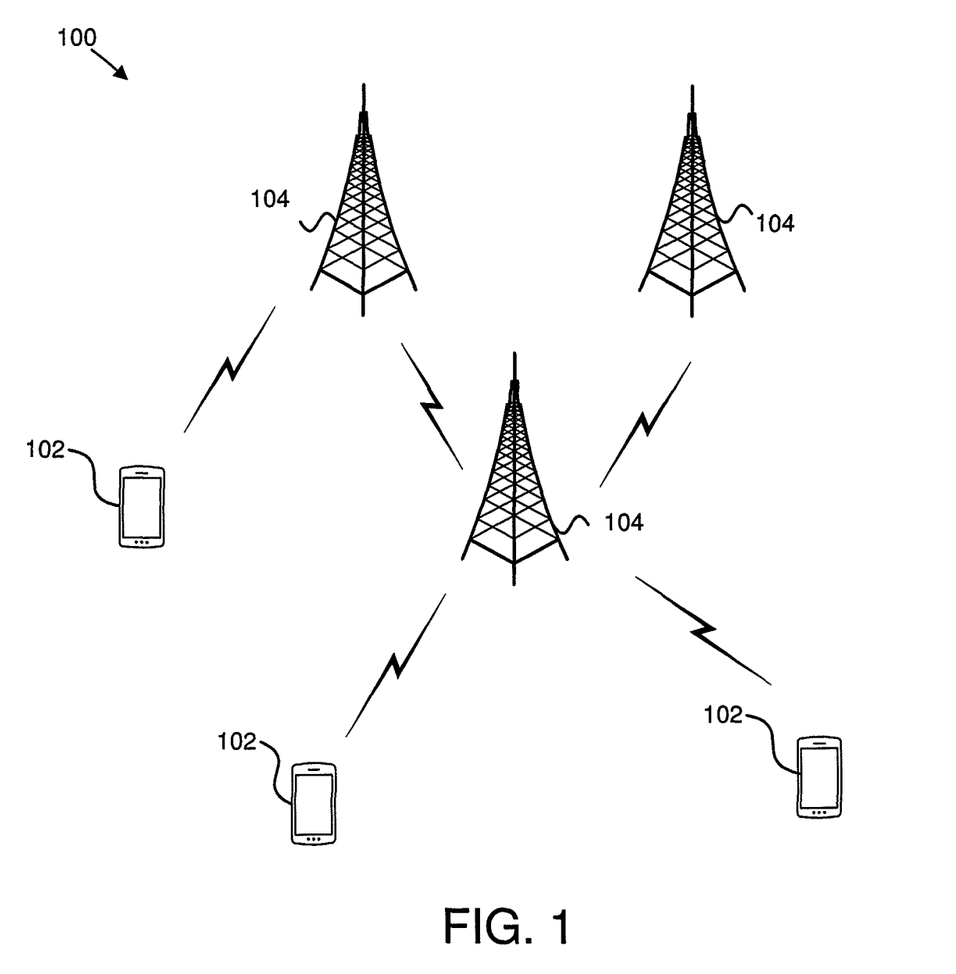
FIG. 1 is a schematic block diagram illustrating one embodiment of a wireless communication system for information having symbol repetition.

FIG. 1 depicts an embodiment of a wireless communication system 100 for information having symbol repetition. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may transmit multiple sets of information. In such an embodiment, each set of information of the multiple sets of information includes a group of basic symbols and optional repetition symbols, and the optional repetition symbols are a repetition of at least part of the group of basic symbols. Accordingly, a base unit 104 may transmit information having symbol repetition.

In one embodiment, a remote unit 102 may receive multiple sets of information. In such an embodiment, each set of information of the multiple sets of information includes a group of basic symbols and optional repetition symbols, and the optional repetition symbols are a repetition of at least part of the group of basic symbols. Accordingly, a remote unit 102 may be used for receiving information having symbol repetition.

Figure 2:
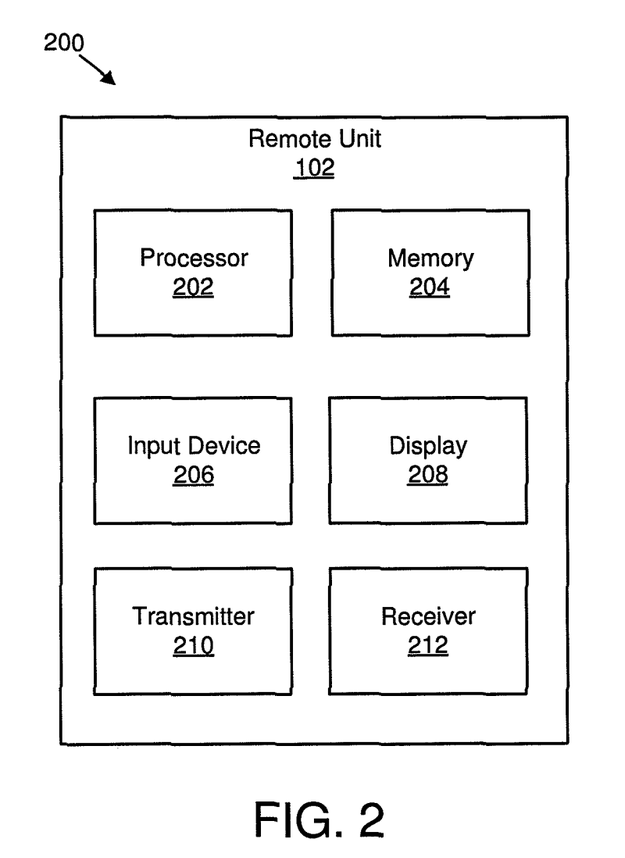
FIG. 2 is a schematic block diagram illustrating one embodiment of an apparatus that may be used for information having symbol repetition.

FIG. 2 depicts one embodiment of an apparatus 200 that may be used for information having symbol repetition. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 may be used to receive multiple sets of information. In such embodiments, each set of information of the multiple sets of information includes a group of basic symbols and optional repetition symbols, and the optional repetition symbols are a repetition of at least part of the group of basic symbols. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
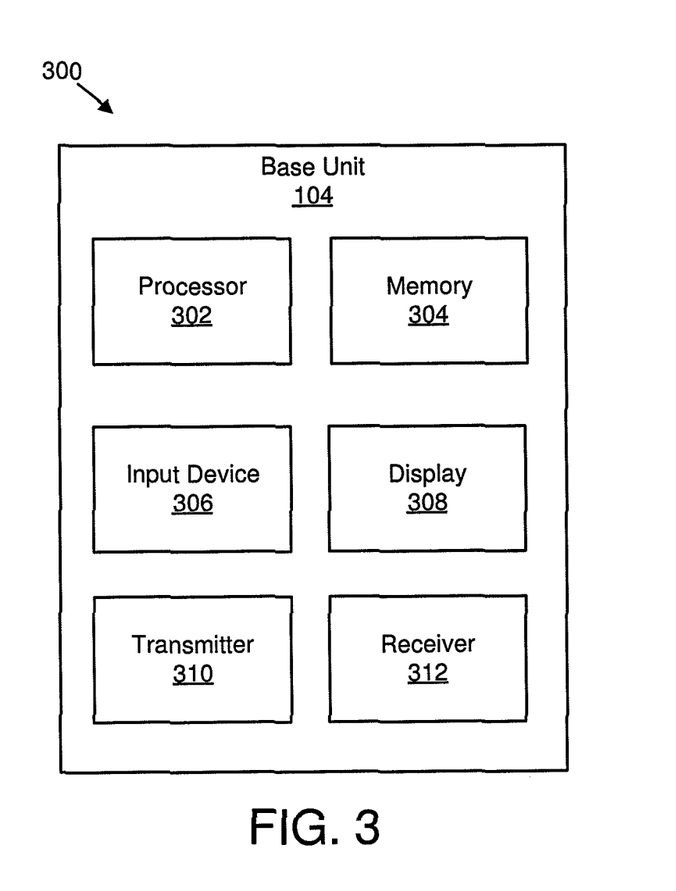
FIG. 3 is a schematic block diagram illustrating one embodiment of an apparatus that may be used for information having symbol repetition.

FIG. 3 depicts one embodiment of an apparatus 300 that may be used for information having symbol repetition. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may transmit multiple sets of information. In such embodiments, each set of information of the multiple sets of information includes a group of basic symbols and optional repetition symbols, and the optional repetition symbols are a repetition of at least part of the group of basic symbols. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
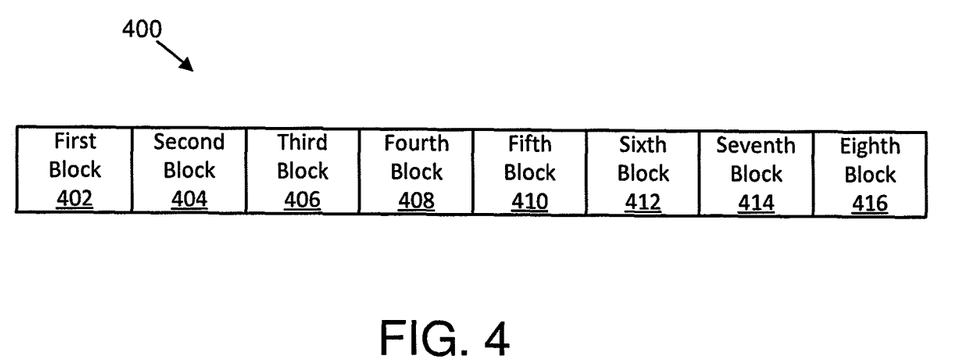
FIG. 4 is a schematic block diagram illustrating one embodiment of a master information block.

FIG. 4 is a schematic block diagram illustrating one embodiment of a master information block 400. The master information block 400 may include any suitable number of blocks. In one embodiment, the master information block 400 includes a first block 402, a second block 404, a third block 406, a fourth block 408, a fifth block 410, a sixth block 412, a seventh block 414, and an eighth block 416.

Figure 5:
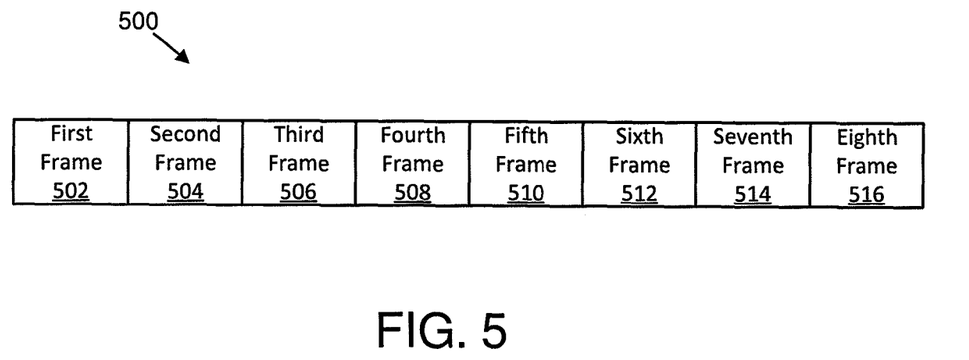
FIG. 5 is a schematic block diagram illustrating one embodiment of a block of the master information block of FIG. 4.

FIG. 5 is a schematic block diagram illustrating one embodiment of a block 500 of the master information block 400 of FIG. 4. The block 500 may represent any of the first block 402, the second block 404, the third block 406, the fourth block 408, the fifth block 410, the sixth block 412, the seventh block 414, and/or the eighth block 416 of the master information block 400. The block 500 may include any suitable number of frames. In certain embodiments, the block 500 includes a first frame 502, a second frame 504, a third frame 506, a fourth frame 508, a fifth frame 510, a sixth frame 512, a seventh frame 514, and an eighth frame 516.

Figure 6:
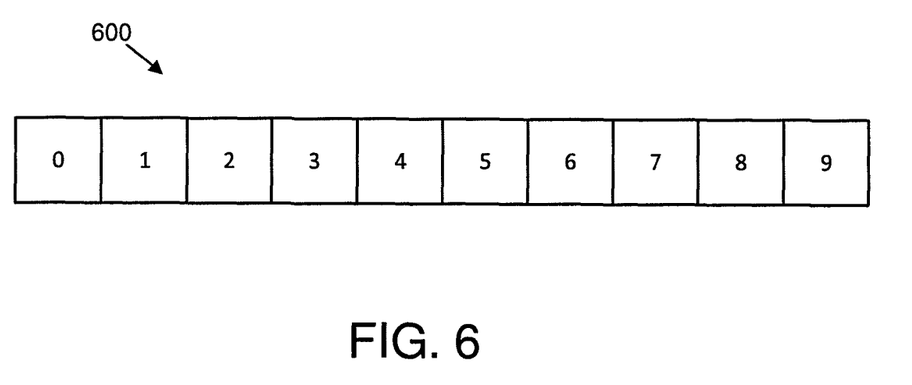
FIG. 6 is a schematic block diagram illustrating one embodiment of a frame of the block of FIG. 5.

FIG. 6 is a schematic block diagram illustrating one embodiment of a frame 600 of the block 500 of FIG. 5. The frame 600 may represent any of the first frame 502, the second frame 504, the third frame 506, the fourth frame 508, the fifth frame 510, the sixth frame 512, the seventh frame 514, and/or the eighth frame 516 of the block 500. In various embodiments, the frame 600 includes 10 subframes as illustrated (e.g., subframes 0, 1, 2, 3, 4, 5, 6, 7, 8, and 9). In some embodiments, the frame 600 spans a 10 ms time period and each of the subframes spans a 1 ms time period.

Figure 7:
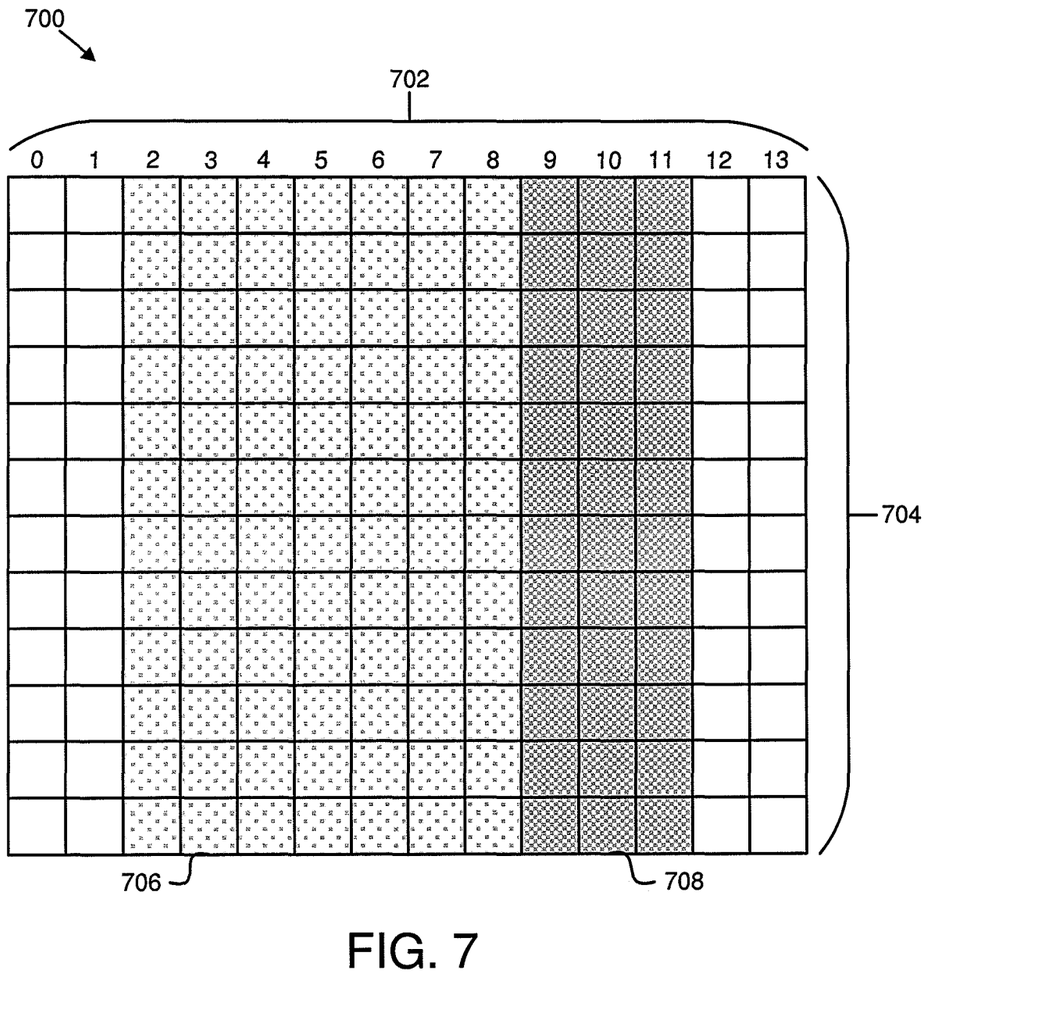
FIG. 7 is a schematic block diagram illustrating one embodiment of a subframe of the frame of FIG. 6.

FIG. 7 is a schematic block diagram illustrating one embodiment of a subframe 700 of the frame 600 of FIG. 6. The subframe 700 may represent any of the subframes 0, 1, 2, 3, 4, 5, 6, 7, 8, and/or 9 of the frame 600. In one embodiment, the subframe 700 represents subframe 1. In another embodiment, the subframe 700 represents either subframe 0, 5, or 6. The subframe 700 includes symbols 702 (e.g., OFDM symbols). As illustrated, the symbols 702 are individually labeled as symbols 0, 1, 2, 3, 4, 5, 6, 7, 8, 9, 10, 11, 12, and 13. In certain embodiments, the subframe 700 includes a number of subcarriers 704. Specifically, as illustrated, the subframe 700 includes 12 subcarriers. The symbols 702 include a group of basic symbols 706 and optional repetition symbols 708. As used herein, the term symbol as used in the group of basic symbols 706 and the optional repetition symbols 708 refers to an information symbol or information having a size of a symbol. Specifically, the group of basic symbols 706 includes symbols 2, 3, 4, 5, 6, 7, and 8. Moreover, the optional repetition symbols 708 include symbols 9, 10, and 11. In one embodiment, symbols 0, 1, 2, 3, 4, 5, 6, 7, 8, 9, 10, and 11 are part of a DwPTS of a TDD special subframe.

In certain embodiments, a set of information (e.g., NB-PBCH) may be mapped to a special subframe (e.g., subframe 1) within the frame 600 (e.g., a 1 PRB bandwidth having a period of 10 ms). In such embodiments, the set of information may include the group of basic symbols 706 (e.g., basic PBCH) and optional repetition symbols 708 (e.g., additional repetition PBCH). In various embodiments, a length of the optional repetition symbols 708 may depend on a DwPTS length of a TDD special subframe. In various embodiments, a coded MIB-NB (e.g., basic PBCH) may be split into 8 blocks. In such embodiments, the coded MIB-NB may be transmitted in a first block of the 8 blocks on a subframe 1 of a first frame using symbols 2 through 8 and repeated in symbols 2 through 8 of subframe 1 of the next 7 consecutive frames. Furthermore, the coded MIB-NB may be transmitted in the remaining 7 blocks in the same manner (e.g., in a subframe 1 of a first frame of the block using symbols 2 through 8 and repeated in symbols 2 through 8 of subframe 1 of the next 7 consecutive frames) until the whole coded MIB-NB is transmitted. In some embodiments, symbols are mapped around a narrowband reference signal ("NRS") and a cell-specific reference signal ("CRS"). In certain embodiments, two antenna ports may be used for NRS and 4 antenna ports may be used for CRS.

In various embodiments, the optional repetition symbols 708 may be determined by: dividing the group of basic symbols 706 into 2 types (e.g., a type 1 symbol with CRS and/or NRS and a type symbol 2 without CRS and/or NRS); mapping the type 1 symbol in the optional repetition symbols 708 with CRS and/or NRS (e.g., map the type 1 symbol to the first symbol with CRS in each of the subframes within a transmitted block; and map the type 1 symbol to the second symbol with CRS in each of the subframes within the transmitted block until all symbols with CRS have mapped type 1 symbols); and mapping the type 2 symbol in the optional repetition symbols 708 without CRS and/or NRS (e.g., map the type 2 symbol to the first symbol without CRS in each of the subframes within a transmitted block; and map the type 2 symbol to the second symbol without CRS in each of the subframes within the transmitted block until all symbols without CRS have mapped type 2 symbols).

One example of determining a mapping for the optional repetition symbols 708 is illustrated in FIGS. 8 through 15.

Figure 8:
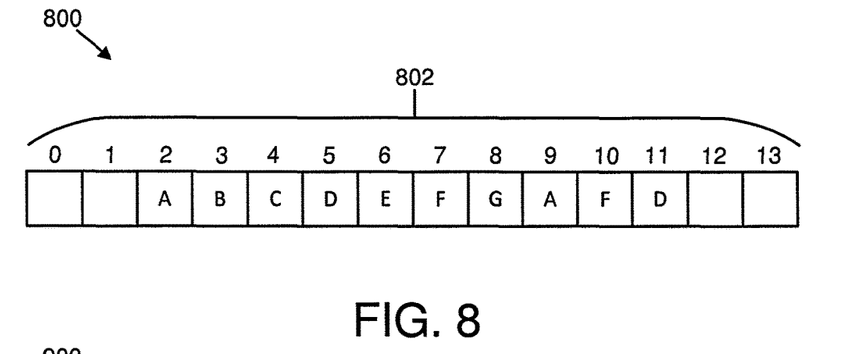
FIG. 8 is a schematic block diagram illustrating one embodiment of a first subframe of information having symbol repetition.

FIG. 8 is a schematic block diagram illustrating one embodiment of a first subframe 800 of information having symbol repetition among symbols 802. Although only one subcarrier is illustrated, there may be up to 12 subcarriers that make a PRB of the first subframe 800. In the illustrated example, type 1 symbols are labeled with one of "A," "B," "C," "F," or "G." Moreover, type 2 symbols are labeled with one of "D" or "E." Symbols 2 through 8 include one of each of symbols with "A," "B," "C," "D," "E," "F," and "G." In this example, the type 1 symbols (A, B, C, F, G) are mapped to symbol 9, then symbol 10 in consecutive 8 frames as illustrated in FIGS. 8 through 15. Moreover, type 2 symbols (D, E) are mapped to symbol 11 in consecutive 8 frames as illustrated in FIGS. 8 through 15. In some embodiments, the type 1 symbols (A, B, C, F, G) may be substantially (e.g., almost) evenly repeated in the optional repetition symbols 708 within a first block of NB-PBCH.

Figure 9:
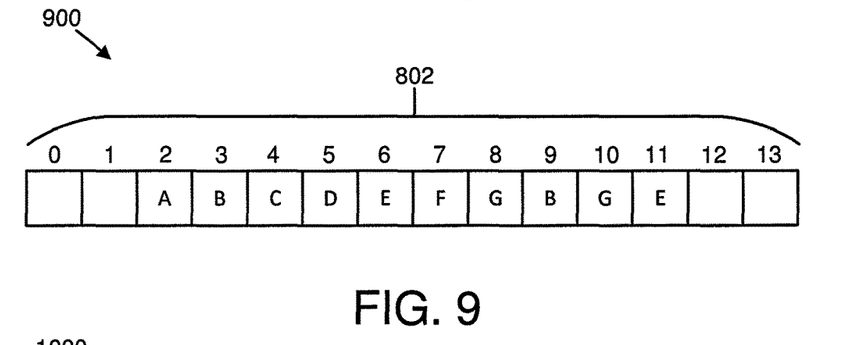
FIG. 9 is a schematic block diagram illustrating one embodiment of a second subframe of information having symbol repetition.
Figure 10:
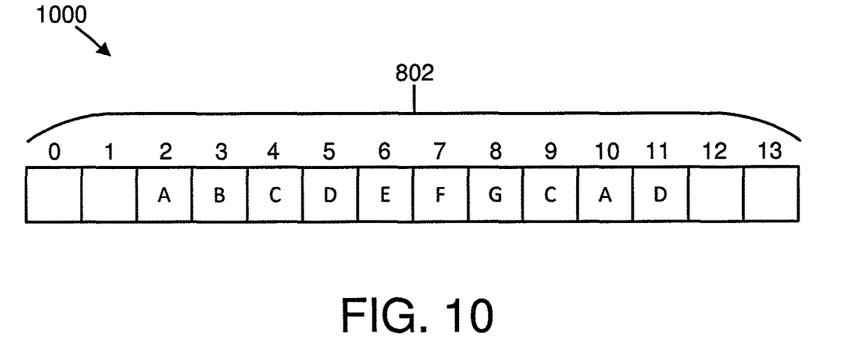
FIG. 10 is a schematic block diagram illustrating one embodiment of a third subframe of information having symbol repetition.
Figure 11:
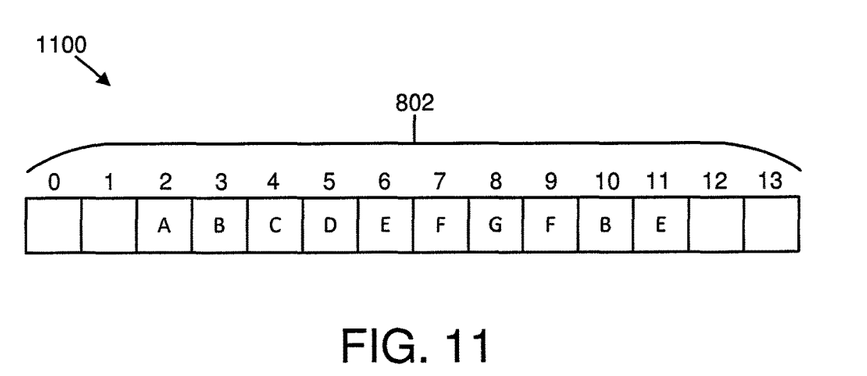
FIG. 11 is a schematic block diagram illustrating one embodiment of a fourth subframe of information having symbol repetition.
Figure 12:
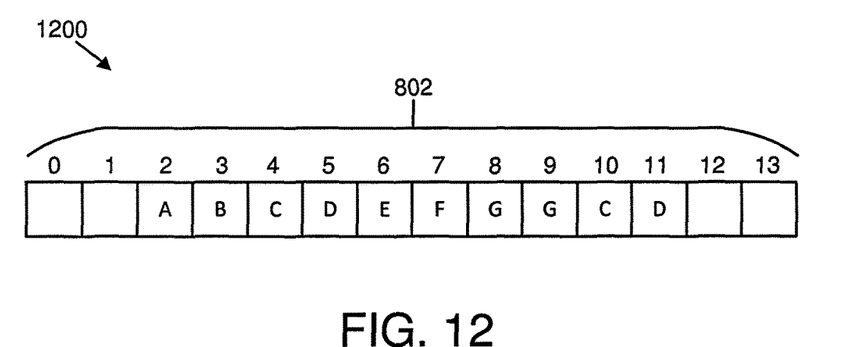
FIG. 12 is a schematic block diagram illustrating one embodiment of a fifth subframe of information having symbol repetition.
Figure 13:
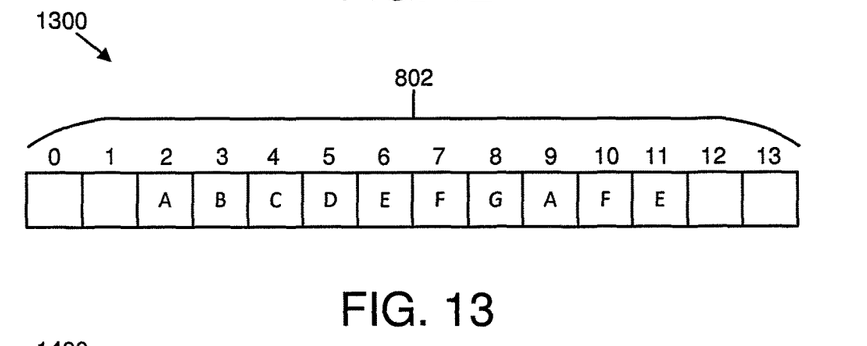
FIG. 13 is a schematic block diagram illustrating one embodiment of a sixth subframe of information having symbol repetition.
Figure 14:
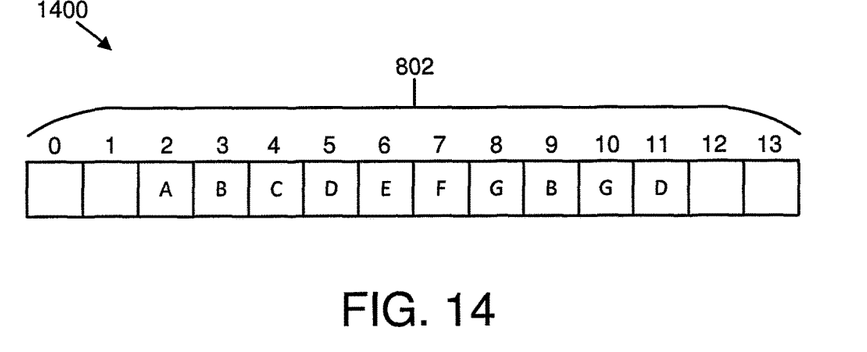
FIG. 14 is a schematic block diagram illustrating one embodiment of a seventh subframe of information having symbol repetition.
Figure 15:
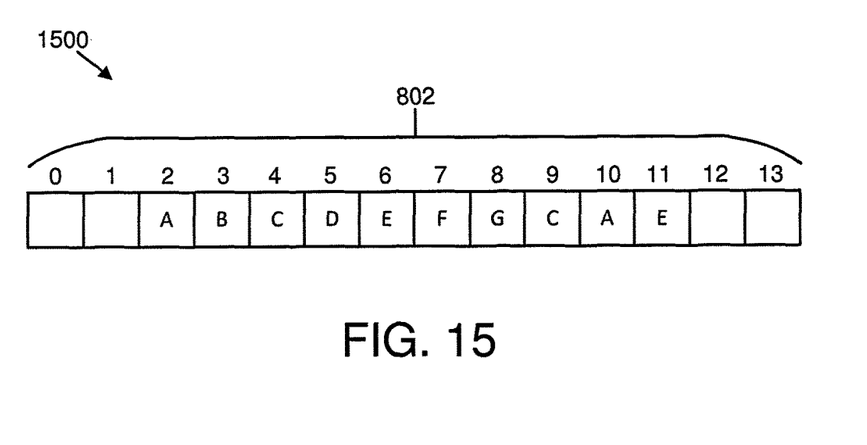
FIG. 15 is a schematic block diagram illustrating one embodiment of an eighth subframe of information having symbol repetition.

FIG. 9 is a schematic block diagram illustrating one embodiment of a second subframe 900 of information having symbol repetition. FIG. 10 is a schematic block diagram illustrating one embodiment of a third subframe 1000 of information having symbol repetition. FIG. 11 is a schematic block diagram illustrating one embodiment of a fourth subframe 1100 of information having symbol repetition. FIG. 12 is a schematic block diagram illustrating one embodiment of a fifth subframe 1200 of information having symbol repetition. FIG. 13 is a schematic block diagram illustrating one embodiment of a sixth subframe 1300 of information having symbol repetition. FIG. 14 is a schematic block diagram illustrating one embodiment of a seventh subframe 1400 of information having symbol repetition. FIG. 15 is a schematic block diagram illustrating one embodiment of an eighth subframe 1500 of information having symbol repetition. Although only one subcarrier is illustrated for subframes 900, 1000, 1100, 1200, 1300, 1400, and 1500, there may be up to 12 subcarriers that make a PRB for such subframes.

Figure 16:
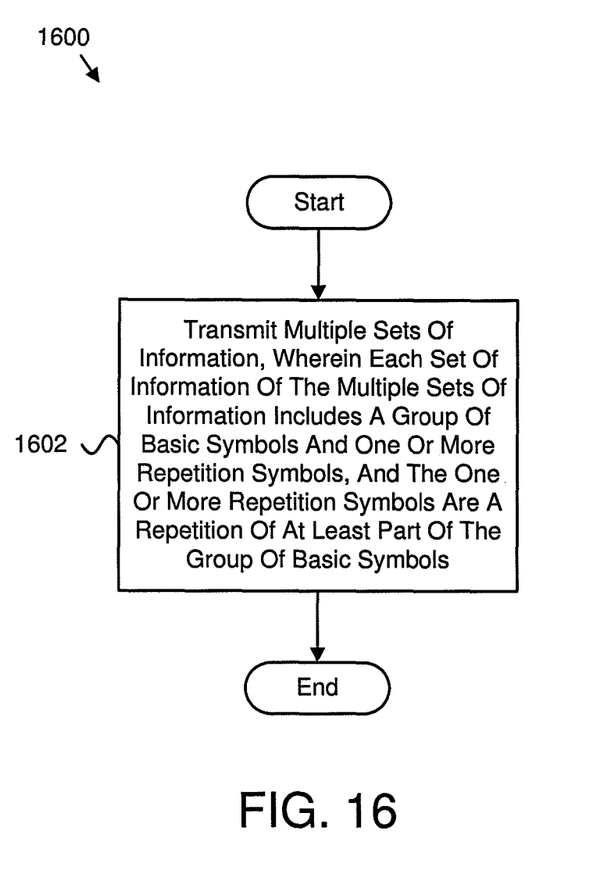
FIG. 16 is a schematic flow chart diagram illustrating one embodiment of a method for information having symbol repetition.

FIG. 16 is a schematic flow chart diagram illustrating one embodiment of a method 1600 for information having symbol repetition. In some embodiments, the method 1600 is performed by an apparatus, such as the base unit 104. In certain embodiments, the method 1600 may be performed by a processor executing program code, for example, a microcontroller, a microprocessor, a CPU, a GPU, an auxiliary processing unit, a FPGA, or the like.

The method 1600 may include transmitting 1602 multiple sets of information. In such an embodiment, each set of information of the multiple sets of information includes a group of basic symbols and optional repetition symbols, and the optional repetition symbols are a repetition of at least part of the group of basic symbols.

In one embodiment, the group of basic symbols is repeated in a first symbol of the optional repetition symbols of the multiple sets of information until the first symbol of the optional repetition symbols of each set of information is filled. For example, if the basic symbols are "1, 2, 3, 4, 5" and a number of repetition symbols is 3 so that each set of information includes 8 symbols, and there are four sets of information, then, a first set of information may be "1, 2, 3, 4, 5, 1, 5, 4," a second set of information may be "1, 2, 3, 4, 5, 2, 1, 5," a third set of information may be "1, 2, 3, 4, 5, 3, 2, 1," and a fourth set of information may be "1, 2, 3, 4, 5, 4, 32."

In certain embodiments, the group of basic symbols is repeated in the optional repetition symbols of a set of information of the multiple sets of information until the set of information is filled. For example, if the basic symbols are "1, 2, 3, 4, 5" and a number of repetition symbols is 3 so that each set of information includes 8 symbols, and there are four sets of information, then, a first set of information may be "1, 2, 3, 4, 5, 1, 2, 3," a second set of information may be "1, 2, 3, 4, 5, 4, 5, 1," a third set of information may be "1, 2, 3, 4, 5, 2, 3, 4," and a fourth set of information may be "1, 2, 3, 4, 5, 5, 1, 2." As another example, if the basic symbols are "1, 2, 3, 4, 5" and a number of repetition symbols is 3 so that each set of information includes 8 symbols (but a potential maximum number of repetition symbols is 4 and the repetition pattern is based on the potential maximum number), and there are four sets of information, then, a first set of information may be "1, 2, 3, 4, 5, 1, 2, 3" (with a 4 symbol in the potential repetition symbol slot 4, but not transmitted), a second set of information may be "1, 2, 3, 4, 5, 5, 1, 2" (with a 3 symbol in the potential repetition symbol slot 4, but not transmitted), a third set of information may be "1, 2, 3, 4, 5, 4, 5, 1" (with a 2 symbol in the potential repetition symbol slot 4, but not transmitted), and a fourth set of information may be "1, 2, 3, 4, 5, 3, 4, 5" (with a 1 symbol in the potential repetition symbol slot 4, but not transmitted).

In various embodiments, one or more symbols of the group of basic symbols are repeated in the optional repetition symbols of each set of information of the multiple sets of information. For example, if the basic symbols are "1, 2, 3, 4, 5" and a number of repetition symbols is 3 so that each set of information includes 8 symbols, and there are four sets of information, then, a first set of information may be "1, 2, 3, 4, 5, 1, 2, 3," a second set of information may be "1, 2, 3, 4, 5, 1, 2, 3," a third set of information may be "1, 2, 3, 4, 5, 1, 2, 3," and a fourth set of information may be "1, 2, 3, 4, 5, 1, 2, 3."

In some embodiments, the group of basic symbols is repeated partially or entirely a number of times among the multiple sets of information. In one embodiment, the multiple sets of information include cell broadcast information. In a further embodiment, the multiple sets of information include system information. In certain embodiments, a number of symbols of the group of basic symbols is fixed or preconfigured by a system. In various embodiments, a number of symbols of the optional repetition symbols ranges from zero to a positive number and is determined based on a system configuration. In some embodiments, a number of the multiple sets of information is fixed or determined based on a system configuration.

Figure 17:
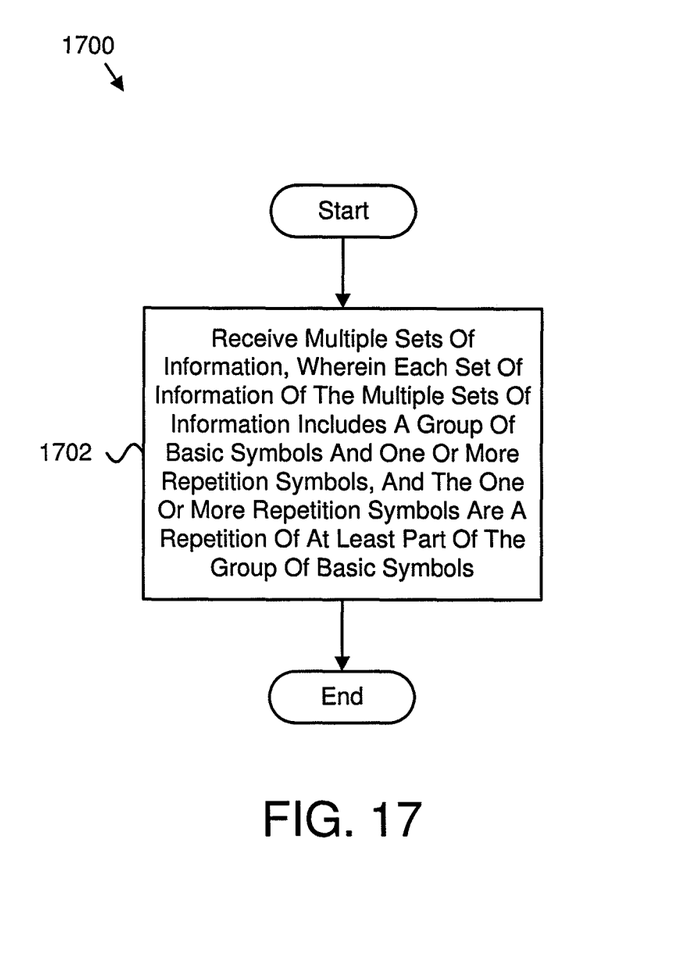
FIG. 17 is a schematic flow chart diagram illustrating another embodiment of a method for information having symbol repetition.

FIG. 17 is a schematic flow chart diagram illustrating another embodiment of a method 1700 for information having symbol repetition. In some embodiments, the method 1700 is performed by an apparatus, such as the remote unit 102. In certain embodiments, the method 1700 may be performed by a processor executing program code, for example, a microcontroller, a microprocessor, a CPU, a GPU, an auxiliary processing unit, a FPGA, or the like.

The method 1700 may include receiving 1702 multiple sets of information. In such an embodiment, each set of information of the multiple sets of information includes a group of basic symbols and optional repetition symbols, and the optional repetition symbols are a repetition of at least part of the group of basic symbols.

In one embodiment, the group of basic symbols is repeated in a first symbol of the optional repetition symbols of the multiple sets of information until the first symbol of the optional repetition symbols of each set of information is filled. In certain embodiments, the group of basic symbols is repeated in the optional repetition symbols of a set of information of the multiple sets of information until the set of information is filled.

In various embodiments, one or more symbols of the group of basic symbols are repeated in the optional repetition symbols of each set of information of the multiple sets of information. In some embodiments, the group of basic symbols is repeated partially or entirely a number of times among the multiple sets of information. In one embodiment, the multiple sets of information include cell broadcast information. In a further embodiment, the multiple sets of information include system information. In certain embodiments, a number of symbols of the group of basic symbols is fixed or preconfigured by a system. In various embodiments, a number of symbols of the optional repetition symbols ranges from zero to a positive number and is determined based on a system configuration. In one embodiment, a number of the multiple sets of information is fixed or determined based on a system configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of wireless communication for transmitting cell broadcast information in a subframe, the method comprising:
   determining a first set of OFDM symbols for transmission and a second set of OFDM symbols for transmission, wherein the first set of symbols comprises a group of basic symbols, the second set of symbols comprises first repetition symbols, and wherein the first repetition symbols are a duplicate of at least two of the group of basic symbols;
   determining a plurality of sets of information, wherein each set of information of the plurality of sets of information comprises the first set of symbols immediately followed by at least one symbol of the second set of symbols;
   determining a number of symbols from the first repetition symbols to fill each set of information of the plurality of sets of information; and
   selecting the determined number of symbols from the second set of symbols to minimize the number of repetitions in each set of information of the plurality of sets of information, wherein the at least one symbol of the second set of symbols that immediately follows the first set of symbols comprises:
      first symbols of the first repetition symbols for consecutive sets of information of the plurality of sets of information;
      cyclic symbols of the first repetition symbols for consecutive sets of information of the plurality of sets of information; or
      fixed symbols of the first repetition symbols for consecutive sets of information of the plurality of sets of information; and
   transmitting the plurality of sets of information.

2. The method of claim 1, wherein the plurality of sets of information comprise cell broadcast information.

3. The method of claim 1, wherein the plurality of sets of information comprise system information.

4. The method of claim 1, wherein a number of symbols of the group of basic symbols is fixed or preconfigured by a system.

5. The method of claim 1, wherein a number of symbols of the first repetition symbols is determined based on a system configuration.

6. The method of claim 1, wherein a number of the plurality of sets of information is fixed or determined based on a system configuration.

7. The method of claim 1, wherein each set of information of the plurality of sets of information comprises the first set of symbols followed by a first symbol of the second set of symbols and a second symbol of the second set of symbols.

8. The method of claim 1, further comprising determining a third set of symbols for transmission, wherein the third set of symbols for transmission comprises second repetition symbols, the second repetition symbols are a duplicate of at least two of the group of basic symbols, and the second repetition symbols are different from the first repetition symbols.

9. The method of claim 8, wherein each set of information of the plurality of sets of information comprises the first set of symbols followed by at least one symbol of the second set of symbols and at least one symbol of the third set of symbols.

10. An apparatus of wireless communication for transmitting cell broadcast information in a subframe, the apparatus comprising:
   a processor that:
      determines a first set of OFDM symbols for transmission and a second set of OFDM symbols for transmission, wherein the first set of symbols comprises a group of basic symbols, the second set of symbols comprises first repetition symbols, and wherein the first repetition symbols are a duplicate of at least two of the group of basic symbols; and
      determines a plurality of sets of information, wherein each set of information of the plurality of sets of information comprises the first set of symbols immediately followed by at least one symbol of the second set of symbols;
      determines a number of symbols from the first repetition symbols to fill each set of information of the plurality of sets of information; and
      selects the determined number of symbols from the second set of symbols to minimize the number of repetitions in each set of information of the plurality of sets of information, wherein the at least one symbol of the second set of symbols that immediately follows the first set of symbols comprises:
- first symbols of the first repetition symbols for consecutive sets of information of the plurality of sets of information;
- cyclic symbols of the first repetition symbols for consecutive sets of information of the plurality of sets of information; or
- fixed symbols of the first repetition symbols for consecutive sets of information of the plurality of sets of information; and a transmitter that transmits the plurality of sets of information.

11. The apparatus of claim 10, wherein the processor determines a third set of symbols for transmission, the third set of symbols for transmission comprises second repetition symbols, the second repetition symbols are a duplicate of at least two of the group of basic symbols, and the second repetition symbols are different from the first repetition symbols.

12. The apparatus of claim 11, wherein each set of information of the plurality of sets of information comprises the first set of symbols followed by at least one symbol of the second set of symbols and at least one symbol of the third set of symbols.

13. A method of wireless communication for receiving cell broadcast information in a subframe, the method comprising:

receiving a plurality of sets of information, wherein:
- each set of information of the plurality of sets of information comprises a first set of OFDM symbols immediately followed by at least one symbol of a second set of OFDM symbols;
- the at least one symbol of the second set of symbols that immediately follows the first set of symbols comprises:
  - first symbols of the first repetition symbols for consecutive sets of information of the plurality of sets of information;
  - cyclic symbols of the first repetition symbols for consecutive sets of information of the plurality of sets of information; or
  - fixed symbols of the first repetition symbols for consecutive sets of information of the plurality of sets of information;
- the first set of symbols comprises a group of basic symbols;
- the second set of symbols comprises first repetition symbols;
- the first repetition symbols are a duplicate of at least two of the group of basic symbols;
- a determined number of symbols from the first repetition symbols fills each set of information of the plurality of sets of information; and
- the determined number of symbols from the second set of symbols minimizes the number of repetitions in each set of information of the plurality of sets of information.

14. The method of claim 13, wherein the plurality of sets of information comprise cell broadcast information.

15. The method of claim 13, wherein the plurality of sets of information comprise system information.

16. The method of claim 13, wherein a number of symbols of the first repetition symbols is determined based on a system configuration.

17. The method of claim 13, wherein each set of information of the plurality of sets of information comprises the first set of symbols followed by a first symbol of the second set of symbols and a second symbol of the second set of symbols.

18. The method of claim 13, wherein each set of information of the plurality of sets of information comprises at least one symbol of a third set of symbols, the third set of symbols for transmission comprises second repetition symbols, the second repetition symbols are a duplicate of at least two of the group of basic symbols, and the second repetition symbols are different from the first repetition symbols.

19. The method of claim 18, wherein each set of information of the plurality of sets of information comprises the first set of symbols followed by two of the second set of symbols and one of the third set of symbols.

20. An apparatus of wireless communication for receiving cell broadcast information in a subframe, the apparatus comprising:

a receiver that receives a plurality of sets of information, wherein:
- each set of information of the plurality of sets of information comprises a first set of OFDM symbols immediately followed by at least one symbol of a second set of OFDM symbols;
- the at least one symbol of the second set of symbols that immediately follows the first set of symbols comprises:
  - first symbols of the first repetition symbols for consecutive sets of information of the plurality of sets of information;
  - cyclic symbols of the first repetition symbols for consecutive sets of information of the plurality of sets of information; or
  - fixed symbols of the first repetition symbols for consecutive sets of information of the plurality of sets of information;
- the first set of symbols comprises a group of basic symbols;
- the second set of symbols comprises first repetition symbols;
- the first repetition symbols are a duplicate of at least two of the group of basic symbols;
- a determined number of symbols from the first repetition symbols fills each set of information of the plurality of sets of information; and
- the determined number of symbols from the second set of symbols minimizes the number of repetitions in each set of information of the plurality of sets of information.

* * * * *